US007050145B1

(12) United States Patent
Drapeau

(10) Patent No.: US 7,050,145 B1
(45) Date of Patent: May 23, 2006

(54) DEVICE FOR COPYING BOTH SIDES OF AN OBJECT IN A SINGLE PASS USING AN OFFICE COPIER

(76) Inventor: Raoul East Drapeau, 2410 Lucket Ave., Vienna, VA (US) 22180

(*) Notice: Subject to any disclaimer, the term of this patent is extended or adjusted under 35 U.S.C. 154(b) by 0 days.

(21) Appl. No.: 11/275,088

(22) Filed: Dec. 9, 2005

(51) Int. Cl.
*G03B 27/32* (2006.01)
*G03G 15/00* (2006.01)

(52) U.S. Cl. ........................... 355/23; 355/24; 355/25; 399/361; 399/365; 399/367; 399/374

(58) Field of Classification Search ................. 355/23, 355/24, 25; 399/361, 365, 367, 374
See application file for complete search history.

(56) References Cited

U.S. PATENT DOCUMENTS 1,614,619 A * 1/1927 Kaplan ........................ 355/23
1,692,544 A 11/1928 Caps
1,696,381 A 12/1928 Caps
3,381,573 A 5/1968 Caldwell
3,475,094 A 10/1969 Kucera et al.
3,561,865 A 2/1971 Burdick, Jr.
3,675,999 A 7/1972 Komori et al.
3,717,411 A 2/1973 Niesen et al.
4,125,324 A * 11/1978 Spence-Bate ................ 355/23
4,782,370 A * 11/1988 Sudou ......................... 355/76

* cited by examiner

*Primary Examiner*—Rodney Fuller

(57) ABSTRACT

A device for use with a copier to make copies of both sides of a document or other objects in a single pass. The device is configured to rest on a copier platen without being attached to the platen and without deriving power from the copier. A document holder in the form of a pair of plates joined by a hinged connection is opened for insertion of a document to be copied. The holder is pivotally attached to a base member and spring-biased to rotate from a first to a second position above the copier platen. As a copier scanner moves beneath the holder temporarily latched in its first position, a first side of the document is scanned. A sensor then causes automatic release of the holder permitting it to swing to its second position for scanning its second side as the holder moves to its second position.

20 Claims, 6 Drawing Sheets

DEVICE FOR COPYING BOTH SIDES OF AN OBJECT IN A SINGLE PASS USING AN OFFICE COPIER

BACKGROUND OF THE INVENTION

1. Field of the Invention

This invention relates to an improvement for a device enabling a copier to scan and copy both sides of at least one object in a single pass of an office copier scanner.

2. Description of Related Art

There are existing devices or accessories that permit copies of both sides of a document to be made onto a single side of a copy paper. They typically employ a hinged holder that rotates about that hinged side and sequentially presents first one side and then the other to the copier as scanning proceeds so that both sides of the object will appear on a single side of the copy paper. These devices take several forms:

One approach requires full manual operation, where the operator must move the document holder from one position to the next so that both sides of the object may be copied. (Niesen et al U.S. Pat. No. 3,717,411, Caps U.S. Pat. No. 1,696,381, Caps, U.S. Pat. No. 1,692,544 and Caldwell U.S. Pat. No. 3,381,573). Not only does this design require considerable attention from the copier operator, but in many office copiers, scanning action is so fast as to make this approach unworkable.

In another approach, the power for flipping the document holder from one side to the other is provided by the motion of the copy platen mechanism (Kucera U.S. Pat. No. 3,475,094, Komori U.S. Pat. No. 3,675,999 and Burdick U.S. Pat. No. 3,561,865). This design requires that the device be mechanically attached to the moving platen securely enough so that the motion of the platen will not displace the device. Further, because the attachment must be demounted to use the copier for other purposes, this approach is unacceptably inconvenient. Moreover, this approach is not applicable to copying machines of the type most commonly used wherein the platen is fixed.

BRIEF SUMMARY OF THE INVENTION

The present invention eliminates the disadvantages of not being able to efficiently and conveniently generate copies of both sides of one or more objects, e.g., documents, in a single scanner pass using a typical office copier. As an example, the administrative staff of a doctor's office often must capture images of both sides of a patient's medical benefits cards for their records. In most instances, the copier operator makes two separate copies, flipping the card(s) between scans, resulting in a product that includes two full size sheets, each with only a limited amount of data. This process demands additional storage capacity for both the product and the copy paper supply. In some cases the operator may take the time to use only a single sheet of copy paper which is laboriously re-fed to the copier in a second scanning pass to capture both images on a single page. As noted above, more recent alternatives involving manually operated document flipping mechanisms or complex platen-driven fixtures have proven wholly unsatisfactory. Past efforts to produce copies of both sides of an object utilizing existing technology have proven inefficient, time consuming, and labor intensive.

The present invention provides numerous advantages over prior art in solving this problem of copying both sides of documents, objects, or other artifacts generally of any size or shape. While items other than documents clearly may be subject to the dual sided copying system described herein, items to be copied will be referred to herebelow as "documents" for simplicity of explanation. This nomenclature of convenience shall not imply, suggest or convey limitations to the invention described and claimed herein.

First, in accordance with the present invention, a portable base member has affixed thereto a document holder in the form of a facing pair of hinged plates. The base member may be substantially transparent or substantially opaque as will be discussed below, and is configured as a copier accessory to rest upon, but without further attachment to, an upper surface of a copier platen. The base member is provided with first and second window zones permitting passage of light from a copier scanner therebelow. The document holder is pivotally attached to said base member at a position between said first and second window zones. Further, the holder, including both plates, is manually set and temporarily latched or restrained against a spring tension into an initial or first position proximate said first window zone to facilitate copying of a first side of a document.

Second, while the holder is latched in said first position, the operator can lift a first one of said hinged plates and insert a document therebetween. Thus, a first side of said document is placed over said first window and the copier platen therebelow. A second side of said document faces in a direction away from said platen. In its normal operation, the copier then scans the first side of the document presented to the scanner.

It should be noted that the base member, if substantially opaque, may be constructed to define passages (e.g., provided with cutouts or discrete transparent areas) to serve as window zones. Further, a base member that is entirely or substantially transparent may be employed, wherein the discrete window zones are integral portions of the base member itself. Still further, the base member may advantageously be fabricated as a combination of opaque and transparent material or features to selectively permit or block light passage as necessary to allow scanning of document sides yet masking other elements of the device from the scan. For example, the portable base plate may be formulated of a continuous, generally opaque structure including discrete transparent portions defining said spaced window zones admitting light transmission to the object holder in each of its first and second positions for copying sides of the object.

Third, upon the electronically sensed passage of a moving scanner, the document holder is automatically unlatched so as to move from said first window zone rapidly under force of said spring tension to a second position proximate or juxtaposed to said second window zone to facilitate copying of a second side of said document as the copier scanner proceeds to pass thereunder. Release of said spring is triggered by photosensitive circuitry that senses the motion of the scanning head past a given location on the device frame. Fourth, the holder incorporates a stop that prevents the documents from being flung out during rapid flipping motion. Fifth, the unique holder device mounted upon its associated base member may be used on any copier, whether said copier has a fixed or moving platen. Importantly, it is not necessary that the holder and base member be physically attached to the copier or its platen since the holder mechanism does not derive its motive force from the copier. Sixth, the device incorporates a velocity damper that slows movement of the document holder as it nears its secondary position so as to avoid jolting and possibly damaging shock to the holder mechanism or to the holder itself.

There is no commercially-available product known that provides the described improvement to a copier accessory. There are several variations of this inventive copier accessory that will be described; all of which fall within the scope of the claims presented herein.

BRIEF DESCRIPTION OF THE SEVERAL VIEWS OF THE DRAWINGS

The invention will be best understood by reference to the following detailed description of an illustrative embodiment when read in conjunction with the accompanying drawings, wherein.

DETAILED DESCRIPTION OF THE INVENTION

Figure 1:
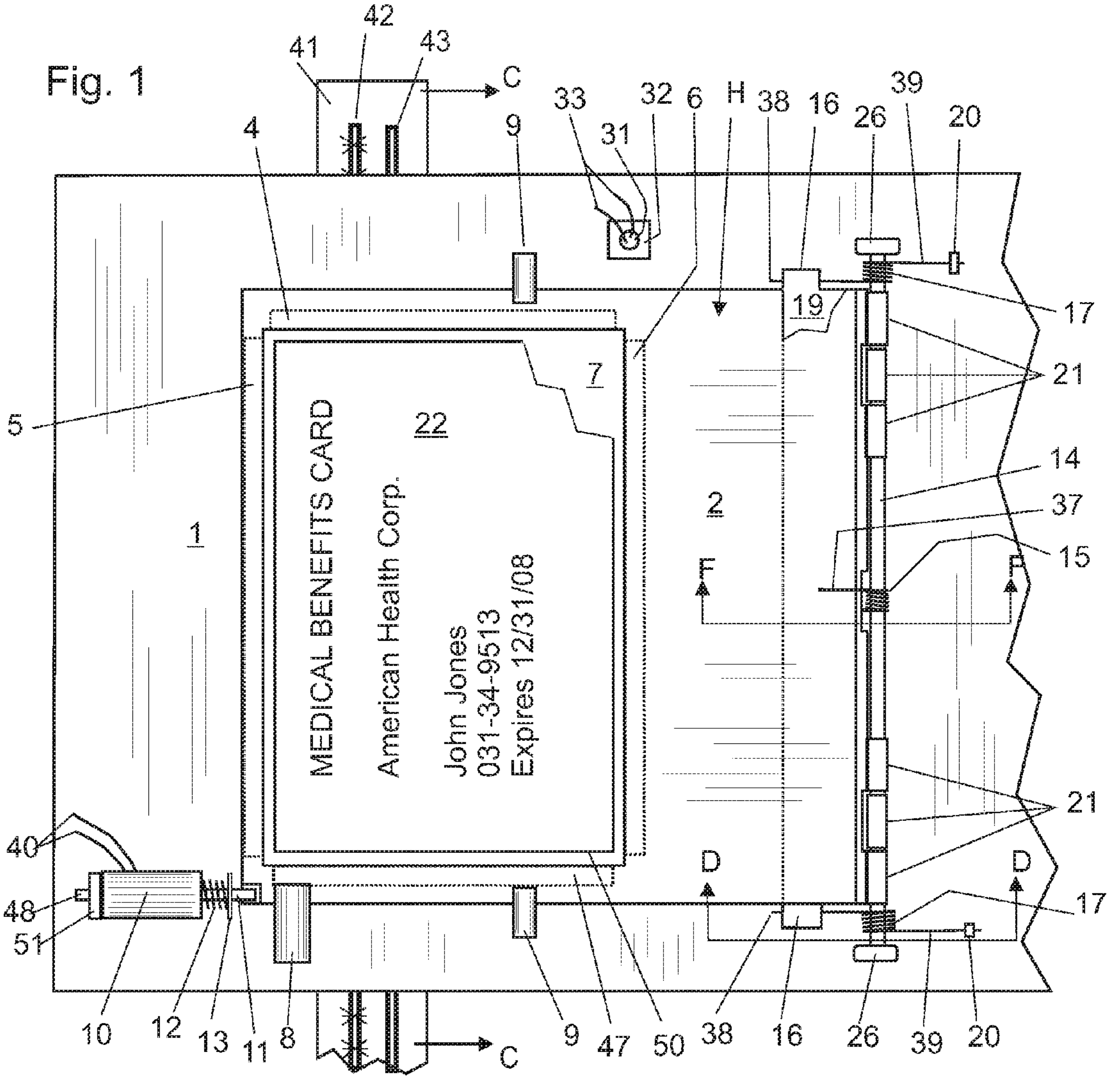
FIG. 1 is a top plan view of a portion of the invention with the holder in a first position on the base member.
Figure 8:
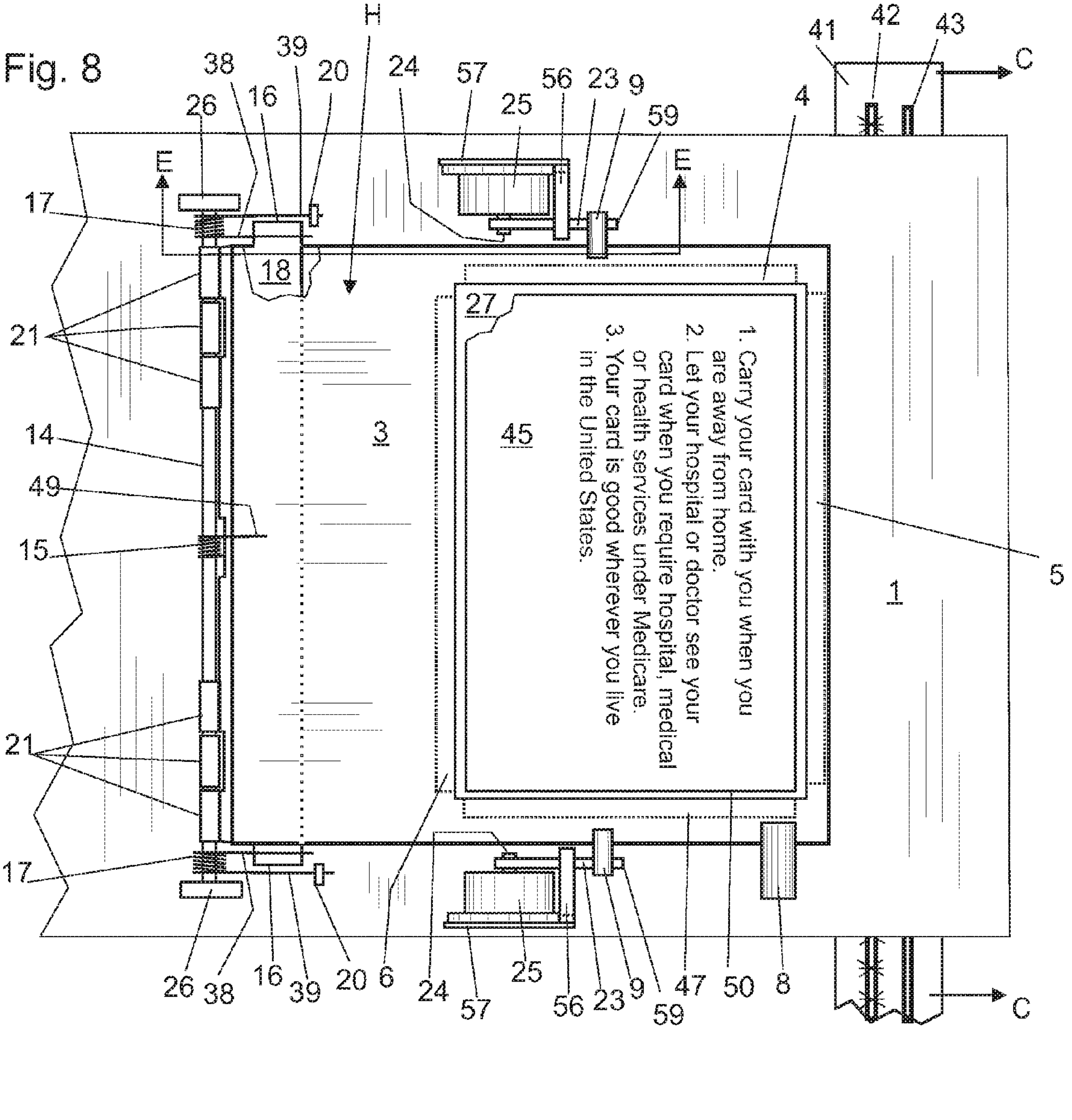
FIG. 8 is a top plan view of a portion of the invention with the holder in a second position on said base member.

FIG. 1 depicts a plan view of the invention device including a portable base member 1 having attached thereto a holder H at rest in a first position, i.e., rotated to the left as viewed herein (see also FIG. 8 for certain reference characters). Portable base member 1 is freely movable from any copier platen on which it is rested for use as an accessory. In its first position, holder H is ready for scanning one side of a document 50. To enable such scanning, the base member 1 is provided a first window zone 7 permitting a reverse (or back) side 45 of said document 50 (see FIG. 8) to be exposed to scanning head 41 having illumination 42, photo sensor 43 and moving in direction C relative to the copier platen and base member. Note that the obverse (or front) side 22 of said document 50 is visible in this view.

Document holder H consists of two generally flat panels 2, 3 (see FIG. 8), each substantially transparent over at least portions of said panels in conformance with said first and second window zones, 7 and 27 respectively. Panels 2, 3 are attached respectively to hinge plates (or leaves) 19 and 18 (see FIG. 8) with interlocking hinge knuckles 21 (hereinafter referred to as hinge 21) between said first window zone 7 and a second window zone 27. Hinge pin 14 supported at each end thereof by mounts 26, serves to hold the hinge knuckles 21 together.

Legs 37 and 49 (see FIG. 8) of torsion spring 15 bias plates or leaves 19, 18 together by acting on the outer surface of panels 2 and 3. Additional torsion springs 17 affixed at first and second locations on pin 14 provide the motive force to urge the holder H from the first position depicted in FIG. 1, towards a second position, as shown in FIG. 8, proximate second window zone 27 where the obverse side 22 of document 50 will be exposed to the scanner for copying. Note that the reverse side 45 is visible in this view. The tabs 16 on hinge leaf 19 provide a surface on which one leg 38 of the torsion springs 17 acts. Ends 39 of springs 17 are attached to the base member 1 using brackets 20 to prevent rotation.

Figure 3:
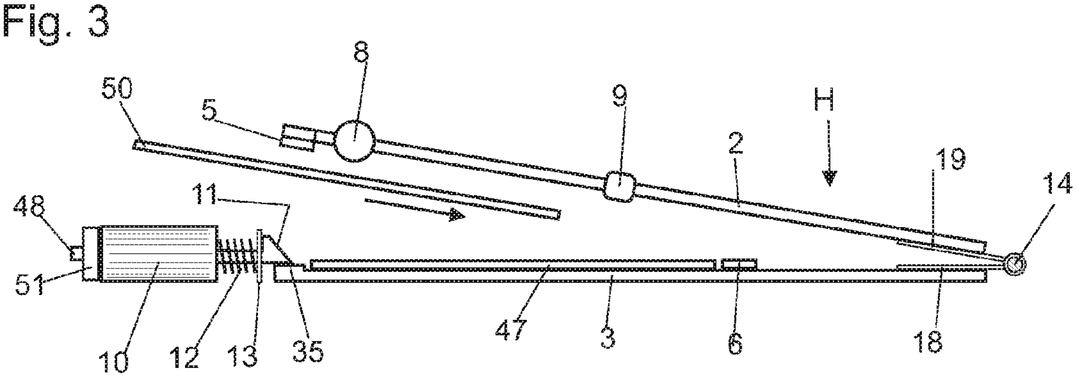
FIG. 3 is a side view of the invention in the loading position with the holder partially open.

Finger grip 8 is used by an operator to return the document holder H from its second position (see FIG. 8) into said first, or latched position as shown here. Once holder H is returned and latched in its first position, grip 8 may then be used by an operator to open the holder H, as shown in FIG. 3, so that the document 50 may be removed. Panel 2 is further provided with actuators 9 along opposite lateral edges thereof for engagement with a damper mechanism to be described in detail herebelow. The actuators 9 are placed at approximately the centers of the lateral edge of the document holder H to best distribute deceleration forces.

Arrayed around the window zone 7 in the base plate 1 and attached to an inner surface of the lower holder panel 3 in the base plate 1 are workstops or guides 4, 6 and 47. These guides act to position the document(s) 50 to be copied and keep such document(s) 50 in place. Guide 5 is attached to an inner surface of the upper panel 2 though guide 5 alternatively may be attached to panel 3. Similarly, guide 47 is shown attached to an inner surface of lower panel 3, though guide 47 alternatively may be attached to upper panel 2. Attachment of guides 5 and/or 47 to upper panel 2 offers distinct advantages to be disclosed herebelow.

Solenoid 10 has a plunger shaft 48 terminating in a spring-loaded catch 11 that releasably engages the lower panel 3 of the document holder H and is controlled by electronic signals through leads 40. The shaft 48 is prevented from failing out of the solenoid under pressure from compression spring 12 by stop 51. Stop 13, affixed to plunger shaft 48 retains the spring 12.

Figure 9:
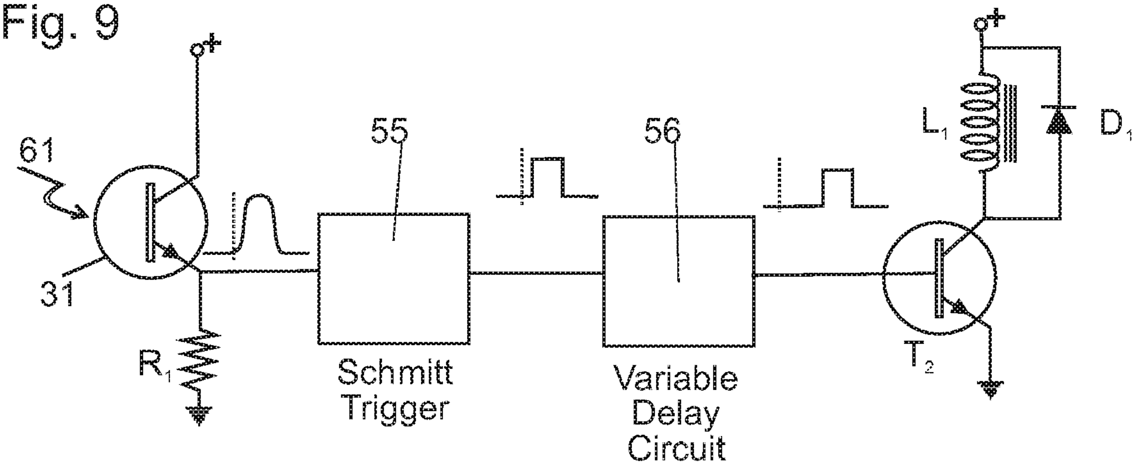
FIG. 9 is a schematic diagram of the drive circuitry for an electromagnetic actuator.

A condition sensing element in the form of photo sensor 31 with leads 33 is mounted facing downward at opening 1A (see FIG. 10) on the baseplate 1 so as to be adjacent to the first window zone and exposed to scanning head 41. Thus, as copying is taking place, photo sensor 31 senses a condition that a first side of the object has been copied, more specifically by sensing the passing of the scanning head 41 and, through the controlling electronics (see FIG. 9), provides a signal to solenoid 10 to automatically release the catch 11 permitting the document holder H to begin its rapid motion towards its second position (as shown in FIG. 8). The position of the photo sensor is shown near the trailing edge of the window zone 7. Through the use of delay circuits as shown in FIG. 9, the resulting signal controlling solenoid 11 may be adjusted to accommodate a wide range of scanner head speeds and light/sensor configurations. In the interest of simplicity and clarity, no cosmetic or safety cover is included in the illustrations.

Figure 2:
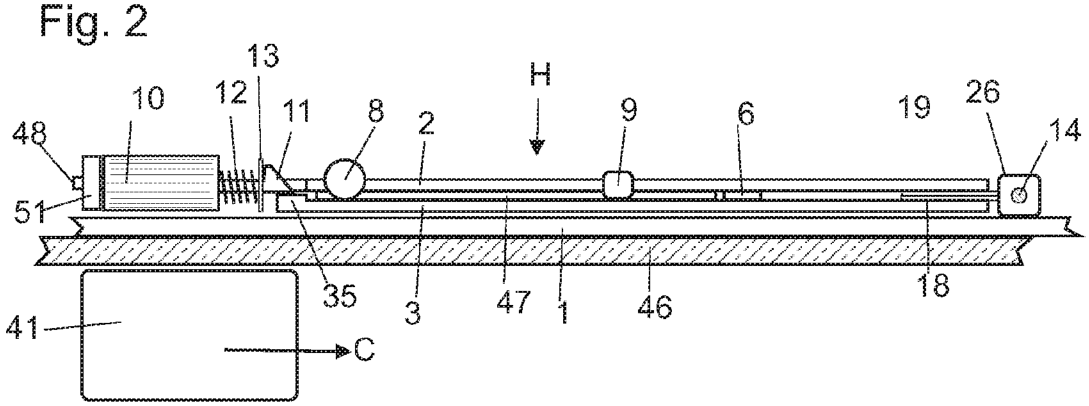
FIG. 2 is a side view of the invention with the holder closed and latched in place.

FIG. 2 is a side view of the inventive device showing the document holder H affixed to base member 1 and resting in its first position, with catch 11 of solenoid 10 engaged with boss 35 located on lower panel 3. Catch 11 has an angled or sloped profile such that when the document holder H is rotated or pivoted by the operator towards its first position, a lower surface of plate 3 bears against the angled or sloped profile of catch 11, pushing plunger shaft 48 and latch 11 aside until the plate 3 is fully down, at which time the plunger shaft 48 and latch 11 move out to engage boss 35 retaining the document holder H in place until released. Shown also in FIG. 2 are scanning head 41 moving in direction C relative to the platen and portions of base plate 1 and platen 46. Elements 2, 6, 8, 9, 12, 13, 14, 18, 19, 47, 48 and 51 are the same as described in FIG. 1. Not shown in FIG. 2 is guide 5.

FIG. 3 is a side view of the document holder with the upper panel 2 raised by lifting the grip 8 to load the document 50. The lower panel 3, at this juncture, remains captured by the catch 11. When fully loaded, the document 50 will rest against one or more of the guides 4 (not shown), 5, 47 and 6. Elements 9, 10, 11, 12, 13, 14, 18, 19, 48 and 51 are the same as described in FIG. 1. Boss 35 is as described in FIG. 2. Not shown in FIG. 3 is mount 26 for shaft 14, scanner head 41, baseplate 1 and platen 46. Guides 5 and/or 47 may be attached to an inner surface of upper panel 2 to simplify the loading and removal process by not having a guide that would interfere with insertion and removal of documents 50 and also to keep documents 50 being copied from being ejected when holder H is flipped or rotated into its second position.

Figure 4:
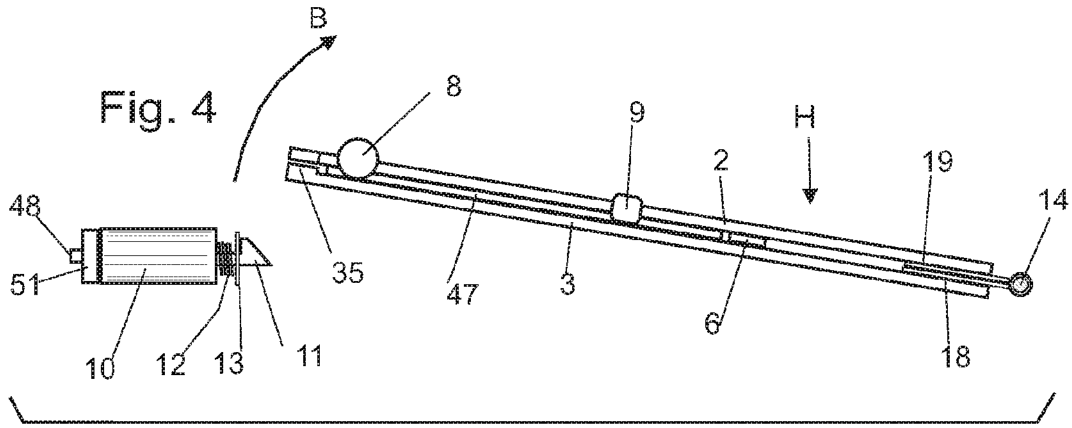
FIG. 4 is a side view of the invention with the holder moving into its second position.

FIG. 4 is a side view of the document holder H after solenoid 10 had been energized, thereby pulling back catch 11, releasing holder H to rotate about hinge pin 14 under the influence of the torsion springs 17 (see FIG. 1) in direction B towards its second position. Elements 2, 3, 6, 8, 9, 12, 13, 14, 18, 19, 47, 48 and 51 are the same as described in FIG. 1. Boss 35 is the same as described in FIG. 2. Not shown in FIG. 4 is mount 26 for hinge pin 14, scanner head 41, guides 4 and 5, base member 1 and platen 46.

Figure 5:
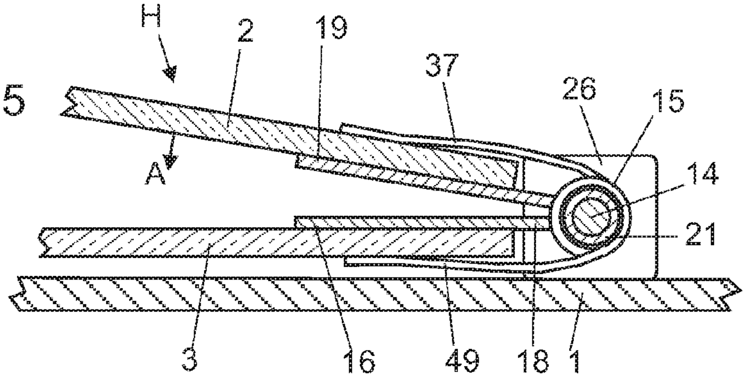
FIG. 5 is a side cross-sectional view of a portion of document holder near the hinged end and while partially open.

FIG. 5 is a side cross-sectional view (section F—F as shown in FIG. 1) of a portion of document holder H near the center of the hinge pin 14 while the two panels 2 and 3 are slightly separated during the loading or unloading process. One leg 37 of the torsion spring 15 bears on the upper panel 2, and another leg 49 bears on the lower panel 3. In the first position of the document holder H, lower panel 3 is fixed (e.g., latched), while upper panel 2 is urged by the force of spring 15 downward toward panel 3 in the direction A. The inner surface of upper panel 2 is attached, such as by adhesive, weld, rivets or the like, to an upper surface of upper leaf 19 of hinge 21. The lower panel 3 is similarly attached to the lower leaf 18. Shown also are tab 16 of leaf 18, a portion of the base member 1, and hinge pin 14 support 26.

Figure 6:
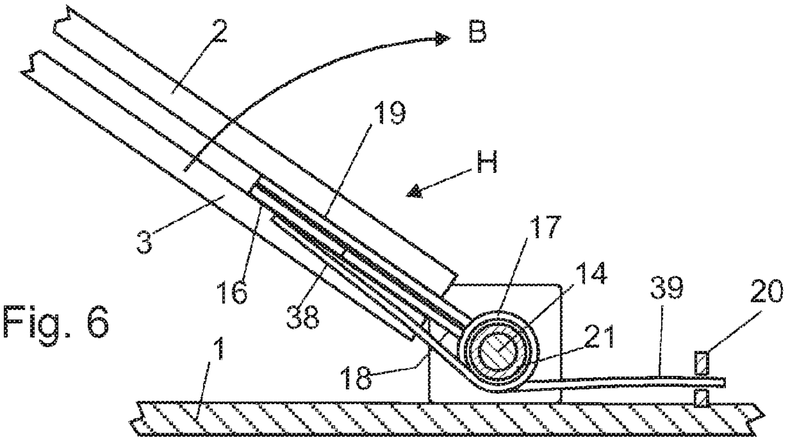
FIG. 6 is a side cross-sectional view of a portion of the document holder near the hinged end, with the holder closed and moving towards the second position.

FIG. 6 is a sectional side view (section D—D as shown in FIG. 1) of a portion of the document holder H near an end of hinge pin 14 with the two panels 2 and 3 pressed together after release from catch 11, and depicted as moving in direction B towards the second position of holder H. The motion of holder H is caused by the force of spring 17, a leg 38 of which presses against tab 16 of lower leaf 18 of hinge 21. The other leg 39 of spring 17 is held in place to base member 1 by drilled bracket 20. Also shown in FIG. 6 are portions of base member 1. Upper leaf 19 is as described in FIG. 5.

Figure 7:
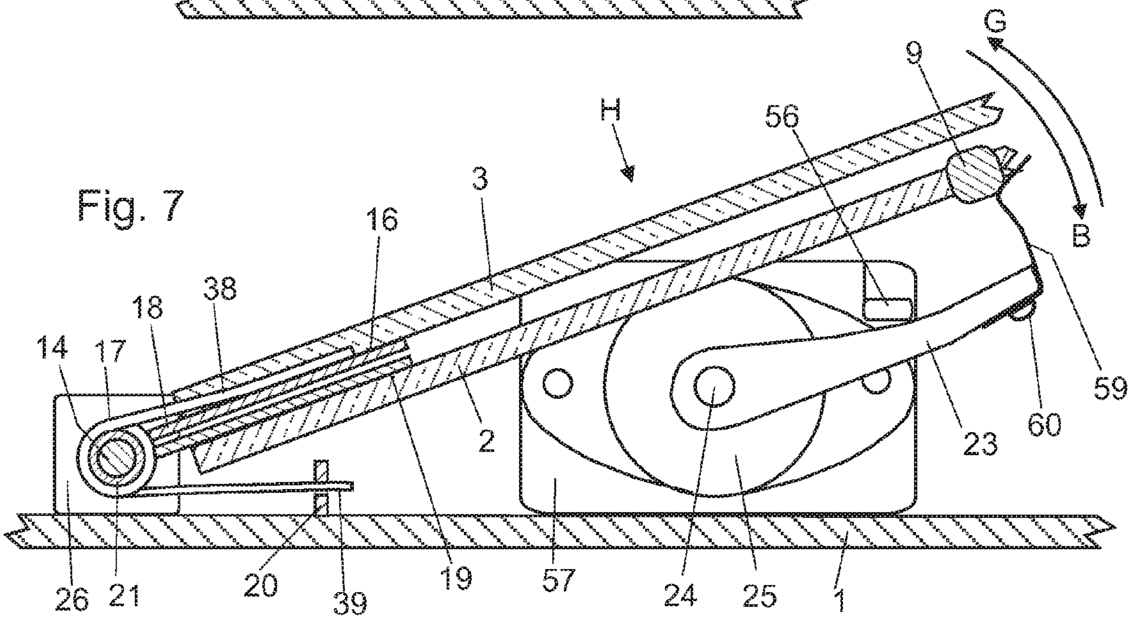
FIG. 7 is a side cross-sectional view of a portion of the document holder near the hinged end, with the holder closed and near the second position.

FIG. 7 is a sectional side view (section E—E as shown in FIG. 8) of a portion of the document holder H near an end of hinge pin 14 while panels 2 and 3 are pressed substantially together, and, under the urging of spring 17, have moved almost to their second position for copying the reverse side 45 of the document 50 (not shown here). As the two panels 2, 3 near the end of their travel almost at their second position, tab 9 begins to engage spring clips 59 attached to damper arms 23 by rivets 60 positioned on said base member 1 at either lateral edge of the panels 2,3. At this moment, the damper arms 23 take the position shown, for reasons that will be explained shortly.

After having pushed spring clips 59 partially aside by the momentum of the moving document holder H acting against the retarding force of dampers 25, tabs 9 engage upper surfaces of damper arms 23, held in position by spring clip 59, and push said arms 23 downward in the direction B until the bottoms of the arms touch base member 1.

Dampers 25, which may be single or paired (as shown), foster a lossy effect in that they act to dissipate energy and thus slow the motion of panels 2, 3 to prevent the mechanical shock that would otherwise occur if panels 2, 3 were to impact the base member 1 upon arrival at said second position. The damper exerts its damping force only in the direction B as shown. In the other direction, G, the force is minimal. Damper 25 may take a number of forms equivalent to that illustrated here, known examples being available from Ace Controls, Inc. of Farmington, Mich.

After copying has been completed via second window zone 27, the document holder H is rotated (or swung) by the operator using grip 8 (see FIG. 8) back from the second position in the direction G, towards the first position. During this return motion, actuator tabs 9 and the tips of damper arms 23 remain in contact (by means of spring clips 59) for an initial portion of the travel of the arms 23. Alternatively, tabs 9 may be ferrous elements or have ferrous tips, and the ends of the arms 23 may include small magnets (not shown) imbedded therein; the purpose being the same, to bias damper arms 23 and actuator tabs 9 together temporarily. (Note: in the alternative, of course, ends of arms 23 may be ferrous and tab 9 tips may include small magnets.) As the holder H is lifted from its second position, damper arms 23 contact stops 56 fixed to base member 1 through damper bracket 57. Force exerted by the operator in rotation of the document holder H easily overcomes the force holding the damper arm 23 and actuator tab 9 together, leaving the damper arm 23 resting against the underside of stop 56 in position for the next copying cycle.

Also shown in FIG. 7 are portions of base member 1. Elements 16, 18, 19, 20, 21, 26, 38, 39 are as described in FIGS. 5 and 6.

FIG. 8 depicts a top plan view of the inventive device in its second position (i.e., rotated to the right as viewed herein) with the document holder H at rest, and with panel 3 visible. Actuator tabs 9 are shown engaged with lever arms 23 of dampers 25. Two dampers 25 are shown for balancing the forces, although one may suffice in other embodiments. Base plate 1 has a window zone 27 serving to expose obverse (or front) side 22 (not visible) of document 50 to scanning head 41 moving in direction C (the reverse side 45 of the document to be copied is visible here). Hinge leaf 18 is attached to lower plate 3 of the document holder. Shown also is the second leg 49 of spring 15 pressing against the outer surface of plate 3. Elements 4, 5, 6, 8, 14, 15, 16, 17, 20, 21, 26, 38, 39, 42, 43, and 47 are as described in FIG. 1 Elements 24, 56, 57 and 59 are described in FIG. 7.

FIG. 9 is a schematic diagram of the drive circuitry for an electromagnetic actuator or solenoid 10 (see FIG. 1). The photo sensor 31 detects light 61 of a passing scanning head 41 (see FIG. 1) and produces an increased current flow in resistor R1. The resulting analog voltage is delivered to a level-sensing digital circuit, commonly known as a Schmitt trigger 55. This digital signal is then delivered to a variable delay circuit 56 that delays the signal by a predetermined amount of time or as determined by the operator to produce a release of the document holder immediately after the scanning head 41 has passed the trailing end of the window 7. For some copiers, a delay may not be needed if the photo sensor 31 is placed so as to sense the passage of the scanning head 41 immediately after it has passed window zone 7. This digital circuit then delivers a current to the base junction of transistor T2. That current is amplified by transistor T2 to drive the coil L1 of solenoid 10 (see FIG. 1), thereby releasing the catch 11 (see also FIG. 1). Diode D1 is provided to swamp any back voltage that may occur when the driving voltage is removed at the end of the driving waveform.

Naturally, there are many other circuits that will provide the equivalent function of sensing the light from the passing scanning head 41 and transforming it into an appropriate pulse of electrical energy to drive the solenoid 10. Recognizing that equivalent circuits may suffice in the function just described, the digital circuit presented herein is by way of example only and not intended as limiting the scope of the present invention in any respect.

Figure 10:
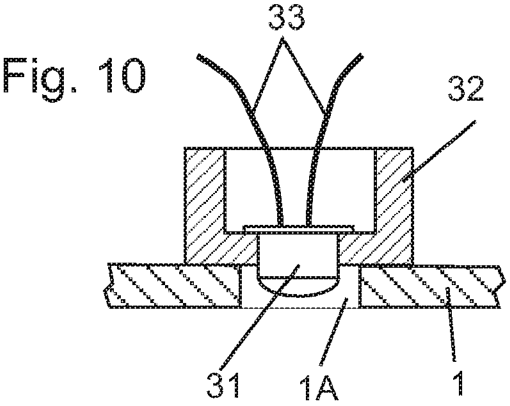
FIG. 10 is a side cross-sectional view of the scanner-sensing photo sensor showing portions of the photo sensor support and base plate in cross-section.

FIG. 10 is a cross-section of support 32 for the phototransistor or photo sensor 31 mounted on base member 1 and with leads 33.

Figure 11:
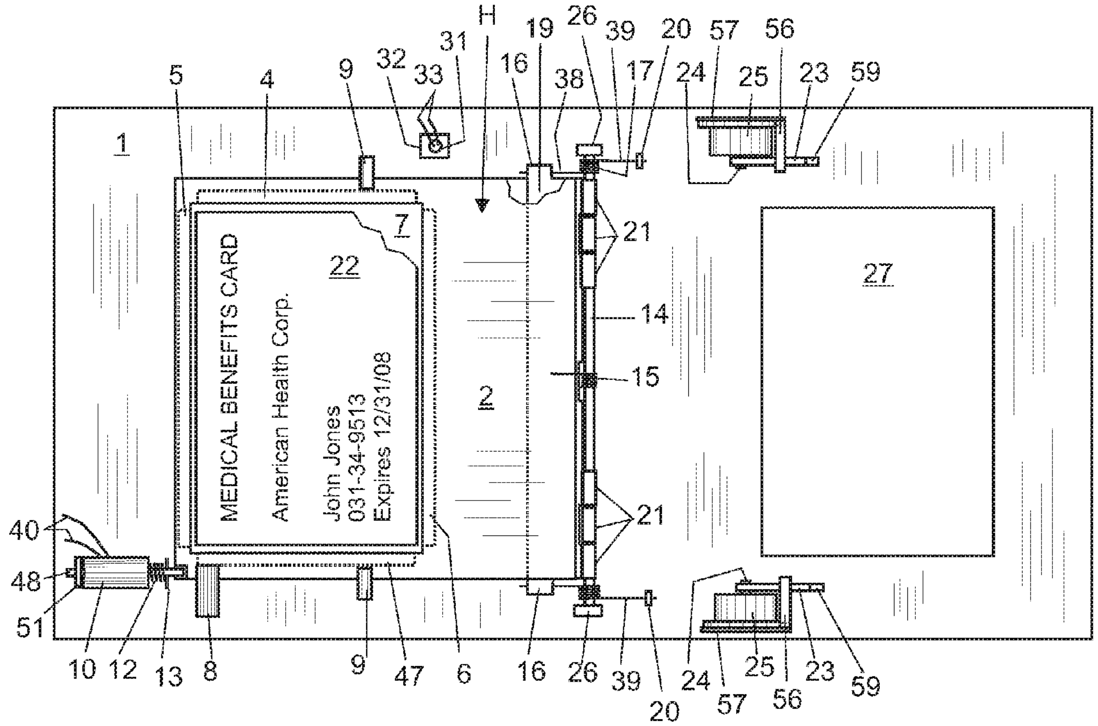
FIG. 11 is a top plan view of the invention showing the document holder in the first position on said base member.

FIG. 11 is a top plan view of the entire base member 1 and structures mounted thereon. See FIGS. 1, 7 and 8 for description of all the referenced elements. Not shown in FIG. 11 is a copier platen or any cosmetic or safety cover therefor.

Figure 12:
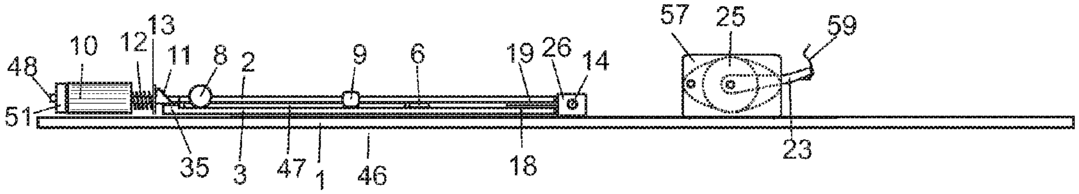
FIG. 12 is a side view of the invention showing the document holder in the first position on the base member.

FIG. 12 is a side view of the inventive device. See FIGS. 2 and 7 for description of all the referenced elements.

It should be clear from the above description that there is nothing in this invention disclosure that restricts the document or other object or artifact being copied to one piece. The object can be more than one card, for example of similar or different sizes. The objects may be black/white, monochromatic, or multicolored in nature. Dimensions of window zones 7 and 27 need only to be sized or adjusted to accommodate the dimensions of the objects, making sure only that there is sufficient gap between the two window zones 7 and 27 to assure that the document holder H can rotate sufficiently quickly to reach the second position by the time that the scanner 43 has moved into position to copy the second side of the object(s). Simply by employing appropriate spring tensions, damper characteristics, mass of the document holder H and dimensions, the holder H can accommodate any practical size and number of objects, subject to the size limits of a copier platen (not shown). Further, additional guides can be employed to more easily accommodate more than one object.

In the foregoing description, the convention used for identifying front and back sides of a document or other object includes the terms “obverse” and “reverse” respectively. This language choice, while conventional, is not intended as structurally limiting. Either side may be copied in any order without impact on the scope of appended claims.

Although the present invention has been thoroughly described in the foregoing detailed description and illustrations, it will be understood that the invention is not limited to the embodiment(s) disclosed, but may assume numerous arrangements, rearrangements, modifications, and substitutions without departing from the spirit of the invention nor from the scope of the following claims.

I claim:

1. A device for use in photocopying both sides of an object, said device including:

a portable base member having a first and a second window zone spaced apart thereon;

an object holder pivotally attached to said base member at a position between said first and second window zones, and moveable between a first position proximate said first window zone to a second position proximate said second window zone;

a first biasing member engaging said object holder and said base member for pivotally biasing said object holder toward said second window zone;

a catch for temporarily restraining said holder in said first position;

said holder including a facing pair of substantially transparent plates;

further including a condition sensing element for producing a control signal upon sensing a condition change;

an automatic latch release mechanism interconnected to said condition sensing element and responsive to said control signal;

a second biasing member for releasably holding said facing pair of plates together so as to releasably hold said object therebetween;

whereby copying of a first side of said object is permitted while said holder is latched at said first window zone, and upon sensing a condition indicating that said first side of said object is copied a signal is generated automatically releasing said catch, permitting said holder to pivot under force of said first biasing member to position said object at said second window zone for final copying of said second side thereof.

2. The device of claim 1 wherein said first biasing member is a spring attached to said base member and forcibly engaging said holder.

3. The device of claim 1 wherein said second biasing member is a second spring engaging each of the facing pair of plates.

4. The device of claim 1 wherein said condition sensing element is a photo sensor positioned adjacent said first window zone, and adapted to sense light passing said first window zone.

5. The device of claim 1 further including at least one damper positioned adjacent said second window zone;

said holder having at least one actuator tab extending outwardly therefrom;

said damper including at least one damper arm for engaging said actuator tab at said second position of said object holder;

whereby said damper absorbs energy from the pivoting object holder to prevent mechanical shock thereto.

6. The device of claim 5 wherein said device is further characterized by said at least one damper arm including a spring clip at an end thereof for initially engaging said actuator tab as said object holder arrives at said second position.

7. The device of claim 6 wherein a damper arm is positioned on said base member adjacent both lateral sides of said object holder;

said object holder further includes a lug projecting from each lateral edge thereof for engagement with said damper arms.

8. The device of claim 1 wherein said portable base plate is a generally opaque plate constructed so as to define open passages serving as said window zones;

whereby said passages admit light to said object holder for said copying said object.

9. The device of claim 1 wherein said portable base plate is a continuous, generally opaque structure including discrete transparent portions defining said spaced window zones;

whereby said transparent portions admit light transmission to said object holder for copying said object, while said opaque structure blocks further light transmission to other device elements.

10. A photocopy machine accessory device for enabling photocopying of both sides of an object on a photocopy machine of the type having a platen and a moving scanner, said accessory device including:

a portable base member having a first and a second window zone spaced apart thereon and adapted to be placed upon a photocopy machine platen;

an object holder pivotally attached to said base member at a position between said first and second window zones, and moveable from a first position proximate said first window zone to a second position proximate said second window zone;

a first biasing member engaging said object holder and said base member for pivotally biasing said object holder toward said second window zone;

a catch for temporarily restraining said holder in said first position;

said holder including a facing pair of substantially transparent plates;

said device further including a condition sensing element for producing a control signal upon sensing a condition change;

an automatic latch release mechanism interconnected to said condition sensing element and responsive to said control signal;

a second biasing member for biasing said facing pair of plates together so as to releasably hold said object therebetween;

whereby copying of a first side of said object is permitted while said holder is latched at said first window zone, and upon sensing a condition indicating that said first side of said object is copied a signal is generated automatically releasing said catch, permitting said holder to pivot under force of said first biasing member to position said object at said second window zone for final copying of said second side thereof.

11. The device of claim 10 where in said first biasing member is a spring attached to said base member and forcibly engaging said holder.

12. The device of claim 10 wherein said second biasing member is a second spring engaging each of the facing pair of plates.

13. The device of claim 10 wherein said condition sensing element is a photo sensor positioned adjacent said first window zone, and adapted to sense light from a photocopy scanner passing said first window zone.

14. The device of claim 10 further including at least one damper positioned adjacent said second window zone;

said holder having at least one actuator tab extending outwardly therefrom;

said damper including at least one damper arm for engaging said actuator tab at said second position of said object holder;

whereby said damper absorbs energy from the pivoting object holder to prevent mechanical shock thereto.

15. The device of claim 14 wherein said device is further characterized by said at least one damper arm including a spring clip at an end thereof for initially engaging said actuator tab as said object holder arrives at said second position.

16. The device of claim 15 wherein a damper arm is positioned on said base member adjacent both lateral sides of said object holder;

said object holder further includes a lug projecting from each lateral edge thereof for engagement with said damper arms.

17. The device of claim 10 wherein said portable base plate is a generally opaque plate constructed so as to define open passages serving as said window zones;

whereby said passages admit light from said moving scanner to said object holder for said copying said object.

18. The device of claim 10 wherein said portable base plate is a continuous, generally opaque structure including discrete transparent portions defining said spaced window zones;

whereby said transparent portions admit light transmission from said moving scanner to said object holder for copying said object, while said opaque structure blocks further light transmission to other device elements.

19. A device for use in photocopying both sides of an object, said device including:

a portable base member having a first and a second window zone spaced apart thereon;

said portable base plate comprises a generally opaque plate constructed so as to define light transmission passage through said window zones;

an object holder including first and second generally transparent plates positioned so as to face one another, and both pivotally attached to said base member at a position between said first and second window zones, and moveable between a first position proximate said first window zone to a second position proximate said second window zone;

a first biasing spring engaging said object holder and said base member for pivotally biasing said object holder toward said second window zone;

a second biasing spring pressing said transparent plates toward one another so as to hold therebetween an object to be copied;

a catch for temporarily restraining said object holder in said first position;

a photo sensor positioned adjacent said first window zone and constructed so as to produce a control signal upon sensing light passing said first window;

an automatic latch release mechanism interconnected to said latch and said photo sensor, and adapted to be responsive to said control signal and release said object holder for rapid movement toward said second position;

said object holder having a pair of actuator tabs extending outwardly therefrom;

whereby copying of a first side of said object is permitted while said holder is latched at said first window zone and, upon sensing copier scanner light passing said first window zone, a signal is generated automatically releasing said catch, permitting said holder to pivot under force of said first biasing member to position said object at said second window zone for final copying of said second side thereof.

20. The device of claim 19 further including a pair of dampers positioned adjacent said second window zone;

said holder having a pair of actuator tabs extending outwardly therefrom;

each of said dampers including at least one damper arm for engaging said actuator tab at said second position of said object holder;

whereby said damper absorbs energy from the pivoting object holder to prevent mechanical shock thereto.

* * * * *